United States Patent [19]
Benson

[11] Patent Number: 5,516,333
[45] Date of Patent: May 14, 1996

[54] TORQUE RESPONSIVE ACTUATION DEVICE FOR A BELT DRIVE SYSTEM

[76] Inventor: Steven R. Benson, 5919 S. 350 West, P.O. Box 57547, Murray, Utah 84107

[21] Appl. No.: 323,611

[22] Filed: Oct. 17, 1994

[51] Int. Cl.$^6$ .................................................. F16H 55/56
[52] U.S. Cl. ...................... 474/19; 192/54.52; 192/93 A
[58] Field of Search ................................. 474/8, 10, 17, 474/19, 21; 192/54.52, 93 A

[56] References Cited

U.S. PATENT DOCUMENTS

| | | | |
|---|---|---|---|
| 3,722,308 | 3/1973 | Steuer | 474/19 |
| 4,173,155 | 11/1979 | Togami et al. | 474/19 |
| 4,378,221 | 3/1983 | Huff et al. | 474/19 |
| 4,585,429 | 4/1986 | Marier | 474/19 X |
| 5,403,240 | 4/1995 | Smith et al. | 474/19 X |

*Primary Examiner*—Richard M. Lorence
*Attorney, Agent, or Firm*—M. Reid Russell

[57] ABSTRACT

The invention in a torque responsive actuator device for a belt drive system as is commonly utilized with snowmobile and like type vehicles. An actuator cover plate of the invention is connected by rods to a lower half of a split pulley, with the upper pulley half mounting a helix or cam cone extending towards the actuator cover plate undersurface that includes a plurality of cam tracks formed therein that are each to receive a cam follower for travel therealong that extends from the actuator cover plate undersurface. Movement of the actuator cover plate towards the top face of the pulley upper half is thereby translated through the rods to spread the pulley upper and lower halves apart, opening a V slot therebetween to a drive belt that is maintained therein. A cylindrical shaft is journaled through the actuator cover plate and fitted through pulley that includes a coil spring disposed therearound for providing spring biasing to urge the actuator cover plate away from the pulley upper half, closing the pulley halves together. To provide minimum friction operation and actuator wear the invention employs cam follower roller bearings as the cam followers and radiuses or forms the cam tracks to have a center apex wherealong a roller of the roller bearing travels through a variety of cam degree angles as the cam followers experience as they travel along the cam tracks during actuator operation.

9 Claims, 5 Drawing Sheets

TORQUE RESPONSIVE ACTUATION DEVICE FOR A BELT DRIVE SYSTEM

BACKGROUND OF THE INVENTION

1. Field of the Invention

This invention relates to clutch type systems and in particular to a torque responsive actuation device for a belt driven power train arrangement as is commonly used on snowmobiles, and the like.

2. Prior Art

The present invention is in a driven clutch assembly or torque responsive actuation device that is a significant improvement over prior systems by an inclusion of cam follower bearings in place of slides for travel along a clutch helix or cam upright tracks that have radiused surfaces, which cam follower travel spreads pulley halves apart. The pulley opening is matched by closure of a drive clutch to where, based upon engine speed, the one clutch opens its pulley reducing the radius the belt traveling therearound senses as the other clutch closes its pulley increasing the pulley radius that the belt senses. The belt is thereby maintained tightly within the pulleys with changes in applied torque producing changes of the clutch pulley radiuses providing for shifting.

To decrease friction and diminish binding between which cam follower bearings and the upright tracks whereon they travel, the tracks are each radiused to present a convex surface therealong that the individual bearing rollers will each travel along, the curved surface providing for centering the roller in the track as the cam follower bearing roller travels therealong. Which center roller travel provides for a very smooth clutch upshift and backshift relative movement and minimizes a roller getting hung up on a track edge as could cause the clutch to lock up. The clutch assembly of the present invention therefore operates more reliably with less component wear than earlier clutch arrangements and an example of an earlier driven clutch arrangement that the present invention improves upon is shown in FIGS. 1 and 1A, that show a driven clutch system known as a Reverse Cam Driven Clutch, manufactured by Arctco, Inc.

SUMMARY OF THE INVENTION

It is a principal object of the present invention in a driven clutch assembly torque responsive actuation device for a belt drive system to provide a clutch system that will produce near frictionless ratio shift changes.

Another object of the present invention is to provide a clutch assembly that is easily operated and provides for a high degree of torque sensitivity and efficiency to allow for quick and precise upshifting and backshifting.

Another object of the present invention is to provide a clutch assembly that includes individual tracks of track sections the clutch helix or cam cone that are curved outwardly from edge to edge to center individual cam following roller travel therealong as the clutch assembly move away and towards one another, the rollers by traveling along the track center, minimizing friction track wear and preclude the rollers from causing bearing binding at a track edge due to side loads.

Another object of the present invention is to provide a clutch assembly that will act quickly to produce essentially zero over-rev condition.

Still another object of the present invention is to provide a unique needle roller bearing clutch assembly or torque responsive actuation device for use in belt driven vehicles, such as snowmobiles, or the like, where the individual roller bearing contact surface is a track that is uniformly radiused along its length to guide roller travel along a track center as the roller travels therealong, throughout a variety of cam angles as could otherwise create side loads on the cam follower, providing a clutch system for easy, smooth, efficient and essentially frictionless shifting that will exhibit a long service life.

In accordance with the above objects the present invention in a driven clutch assembly or torque responsive actuation device for a belt drive system includes a pulley that is formed from upper and lower halves that, when fitted together, form a deep V therebetween for receiving a drive belt disposed therein. The upper pulley half includes a center hole and spaced holes formed in a hub thereof at equal radial distances from the pulley half center wherethrough extend piers that are secured at right angles to project upwardly from the lower pulley half. The piers are radially equally spaced from the lower pulley half center and extend therefrom, through the upper pulley half top surface. Also mounted to extend upwardly from the upper pulley half top face is a cylindrical helix or cam cone that preferably includes three identically equal spaced helix or cam sections formed therein. Which helix or cam sections are each at equal radial distances from the upper pulley half center. The identical helix or cam sections are preferably formed by appropriately machining a metal cylindrical section to leave a flat bottom surface that is arranged to be mounted to the upper pulley half top surface such that the helix or cam cone extends at approximately a right angle outwardly therefrom.

A cam track is formed in each helix or cam section from a lower corner at the junction of a cylinder ring bottom end and upper pulley half top face, and extending straight across the cylinder segment to an upper distant corner thereof. Each cam track is thereby at an angle upwardly from the pulley half upper face.

A sealed needle bearing roller, as set out below, is arranged to travel along each cam track of the invention. To maintain the bearing roller centered on which cam track as it rolls therealong, thereby avoiding track edge wear and a possibility of causing bearing binding at the track edge due to side loads, the cam track of the invention is radiused thereacross, providing a uniform convex surface between the cam track edges. The radius of which convex surface is selected such that the roller traveling therealong will follow a path along the track center throughout a variety of cam angles. Rather than the bearing roller traveling from one track edge to the other as occurs with a flat cam track of earlier clutches.

Three sealed needle bearing are journaled to extend at right angles from the side of posts that are each secured at equal spaced radial intervals to extend outwardly from an actuate or clutch cover plate assembly undersurface. The posts are each adjacent to an arcuate slot that has been formed through the clutch cover plate wherethrough helix of cam cone track sections project when the clutch cover plate undersurface is moved towards the pulley half upper face. To control which movement, the clutch cover plate is guided on a cylindrical shaft that is journaled, at a right angle, through a bushing maintained in a center hole of the clutch cover plate and a hole formed through the pulley center. The cylindrical shaft is secured to the upper pulley half and is journaled through and extends beyond the lower pulley half. To further direct clutch cover plate movement towards the upper pulley half top face, separating the upper and lower pulley halves to operate the clutch of the invention, piers are secured to extend at right angles upwardly from the lower pulley half hub area. The piers are to fit through holes formed through in the upper pulley half hub area and each includes a cylindrical rod extending axially therefrom. The cylindrical rod ends are each stepped inwardly, to pass through and are secured at a right angle to the clutch cover plate undersurface. So arranged, when the clutch cover plate is moved towards the upper pulley half face, with the rollers of cam follower bearings rolling traveling upwardly on the cam tracks, the clutch cover plate and connected lower pulley half will slightly pivot or turn in the arcuate pier holes formed in the upper pulley half. Simultaneous to the lower pulley half is being urged away from the upper pulley half, opening the V at the junction of which upper and lower pulley halves, pulley halves of a drive clutch are being moved together, thereby, maintain a drive belt in a taught state, shifting taking place by a change in ratios of the driven and drive clutches.

To urge the clutch cover plate and upper pulley half apart, a coil spring is disposed over the cylindrical with the spring ends contacting the opposing clutch cover plate undersurface and upper pulley half top face, biasing them apart. Which biasing is overcome by moving the clutch cover plate towards the upper pulley half, thereby separating the pulley halves, to open the pulley V, reducing the radius thereof.

THE DRAWINGS

The following drawings illustrate that which is presently regarded as the best mode for carrying out the invention:

DETAILED DESCRIPTION

Figure 1:
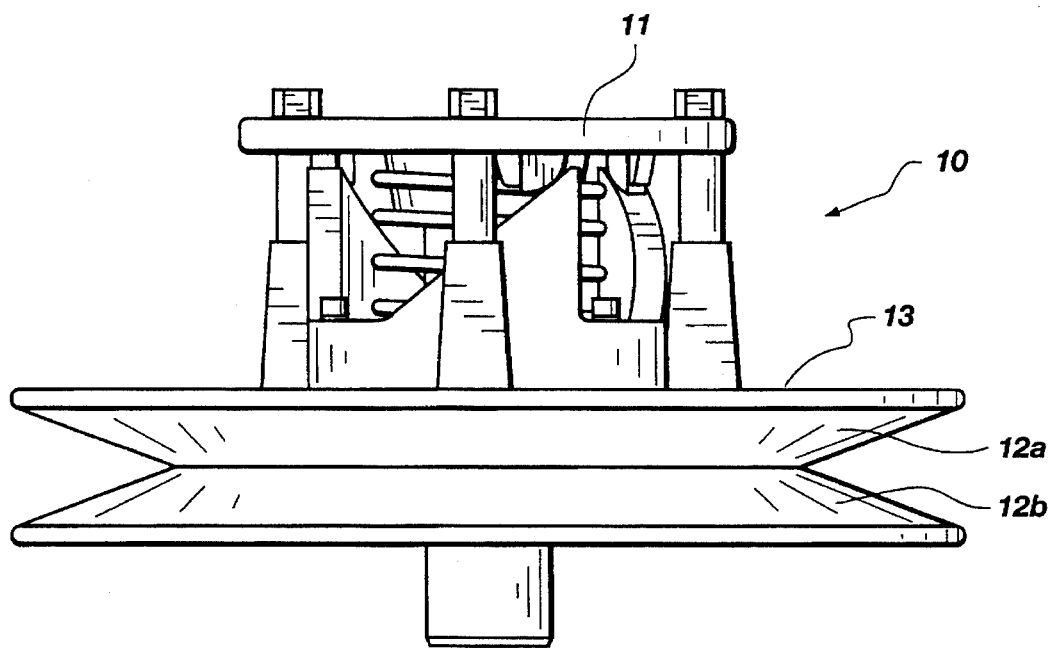
FIG. 1 is a side elevation view of an earlier prior art example of a driven clutch assembly.
Figure 1A:
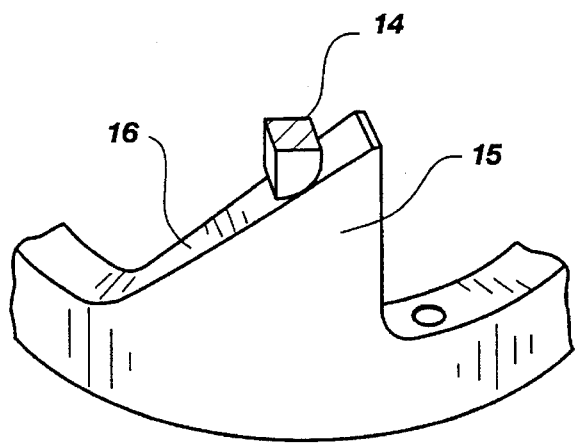
FIG. 1A is an enlarged section of the clutch helix or cam cone of the driven clutch assembly of FIG. 1 showing a slide thereof traveling along a flat track of which helix or cam cone section.

FIGS. 1 and 1A shown an example of an earlier driven clutch assembly 10, hereinafter referred to as clutch, manufactured by Arctco, Inc. identified as a Reverse Cam Driven Clutch that the present invention improves upon. Clutch 10 of FIGS. 1 and 1A, is like a driven clutch assembly 20, of the invention shown in FIGS. 2 and 3, clutch 10, as shown in FIG. 1 is operated to move a clutch cover plate 11, towards a top face 13 of a first or upper pulley half 12a to, for spreading apart upper pulley half 12a from a lower pulley half 12b, opening a V therebetween. By opening which V, the pulley radius is reduced increasing the speed a drive belt passed thereover which drive belt also passes over a drive clutch pulley travels, whose radius is increased as the driven clutch pulley radius is decreased. The drive belt thereby remaining taught over the respective pulley, which the pulley's change in radius providing for shifting with changes in applied torque. While performing the same functions, the driven clutch assembly or torque responsive actuation device 20 of the present invention, hereinafter referred to as clutch 20, is a significant departure from earlier driven clutch assemblies, like the clutch 10, in that it includes cam follower bearings that each include a roller whose shaft is journaled to turn on sealed needle bearings, and each roller is arranged for traveling along a clutch cover plate helix or cam track, providing minimizing component wear and friction between components and precludes roller binding due to side loads as occur when the roller travels to a track edge. The roller and cam track of the invention improves upon the slide arrangement 14 of FIG. 1A of earlier clutch 10 that is shown sliding along a flat track 16 of a helix or cam track 15.

Figure 2:
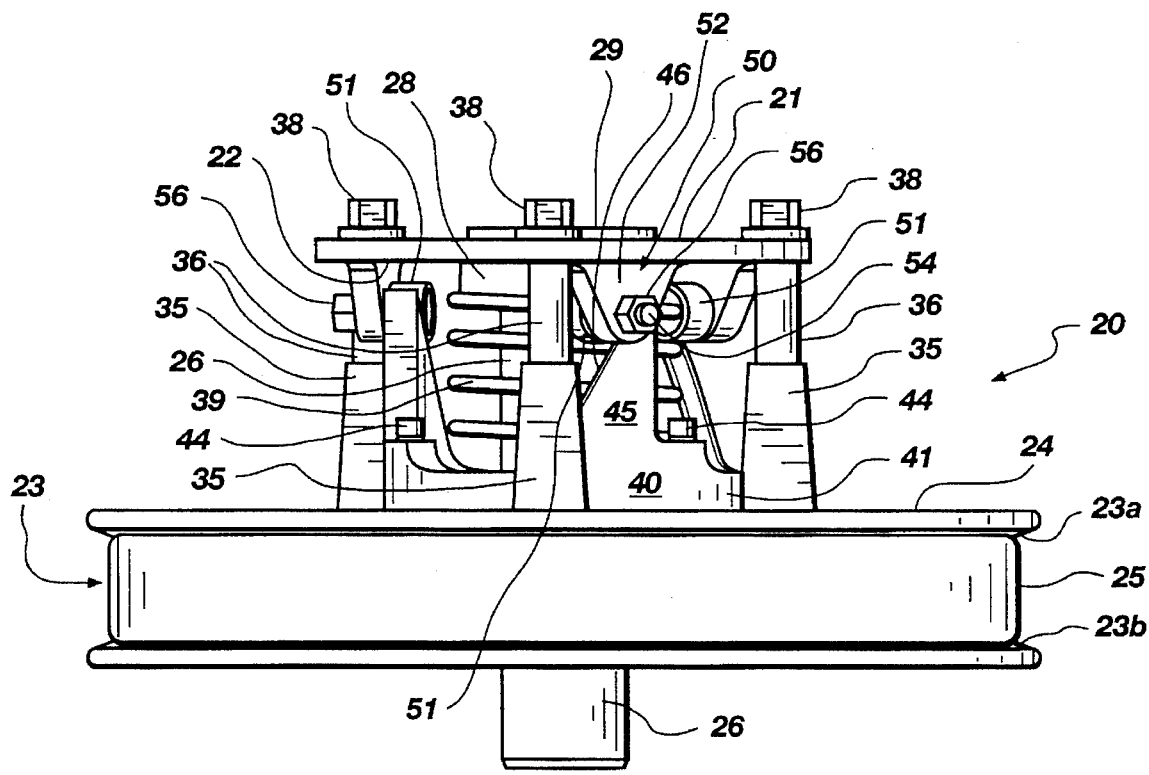
FIG. 2 is a view like FIG. 1 of a driven clutch assembly or torque responsive actuation device of the present invention, that is shown in broken likes being operated to spread apart upper and lower pulley halves.
Figure 2A:
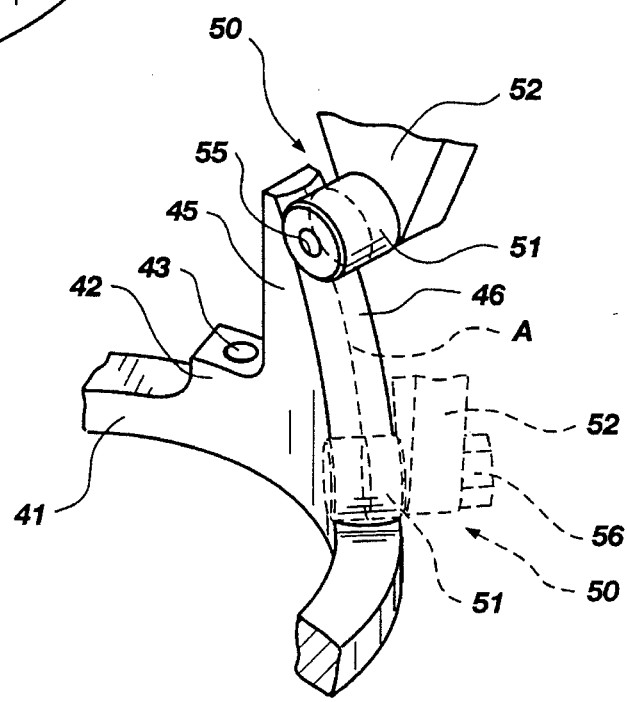
FIG. 2A is a view like that of FIG. 1A of a section of the clutch helix or cam cone of the driven clutch assembly of FIG. 2 showing a cam follower bearing roller traveling along a radiused track surface, showing the roller path of travel along the track surface in broken lines.
Figure 6:
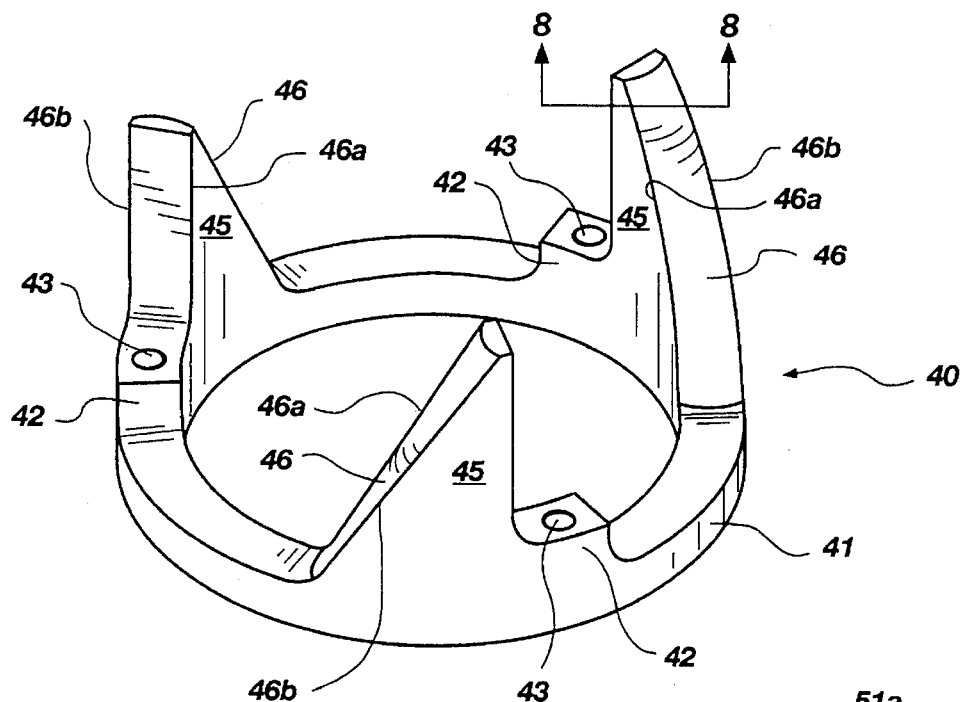
FIG. 6 is a side elevation perspective view of the helix or cam cone of the driven clutch assembly torque responsive actuation device of FIGS. 2 and 3 removed from its mounting onto the top face of the upper pulley half.
Figure 7:
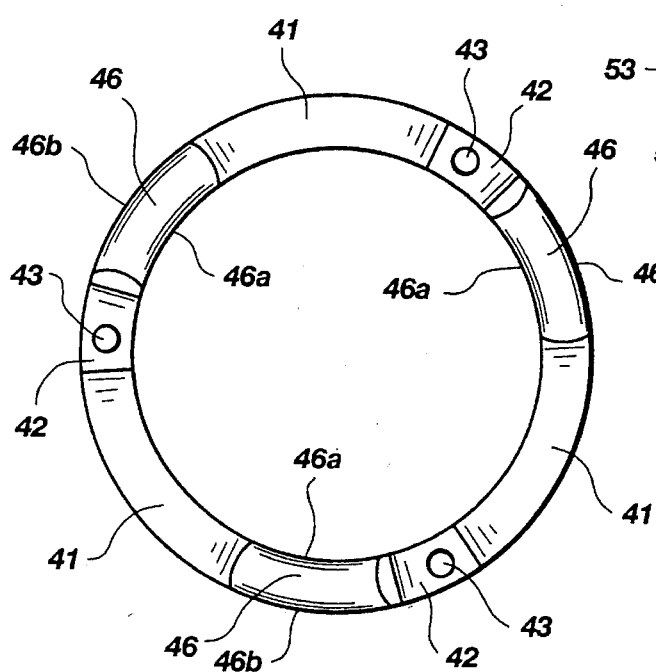
FIG. 7 is a top plan view of the helix or cam cone of FIG. 6.

Individual clutch plate helix or cam track wear and roller binding are dramatically improved with the present invention that provides for a radiusing of each cam track, as shown in FIGS. 6 and 7, to form a convex surface thereacross that guides the roller travel along the center of which cam track, as shown in FIG. 2A, between the track edges. Distinct from clutch 20 of the invention, clutch 10 of FIGS. 1 and 1A, that illustrate a prior clutch arrangement, has a helix or cam cone with cam tracks formed therein that are essentially flat between the track edges. Such flat cam track surface, as shown in FIG. 1A, produces a path of travel of each clutch plate slide 14 that is from one track 16 edge to the other, the roller to experience side loads during clutch operation. The side loads at which track edges the slide experiences as it travels through the varied cam angles during travel over the cam track, also produce unequal slide and cam track wear. Further, should a roller bearing be employed in place of slide 14, that roller will experience side loads thereon as the roller changes position through varied cam angles as it travels from one cam track side to the other, potentially causing roller binding and damage. Earlier clutches, like clutch 10, are both stiff and hard to operate and require frequent repair to replace worn slides 14 and the helix or cam cone 15. Distinct therefrom, the present invention provides a clutch 20 whose operation is both smooth and easy, exhibits minimum wear of the preferred cam follower bearing rollers, and, along with a drive clutch arrangement, provide a quick acting shifting at essentially a zero over-rev condition. Further, as individual roller travel is centered longitudinally along the cam track, side loads on each cam follower roller as are present at the track edges and can cause roller binding and damage, are negated.

Figure 3:
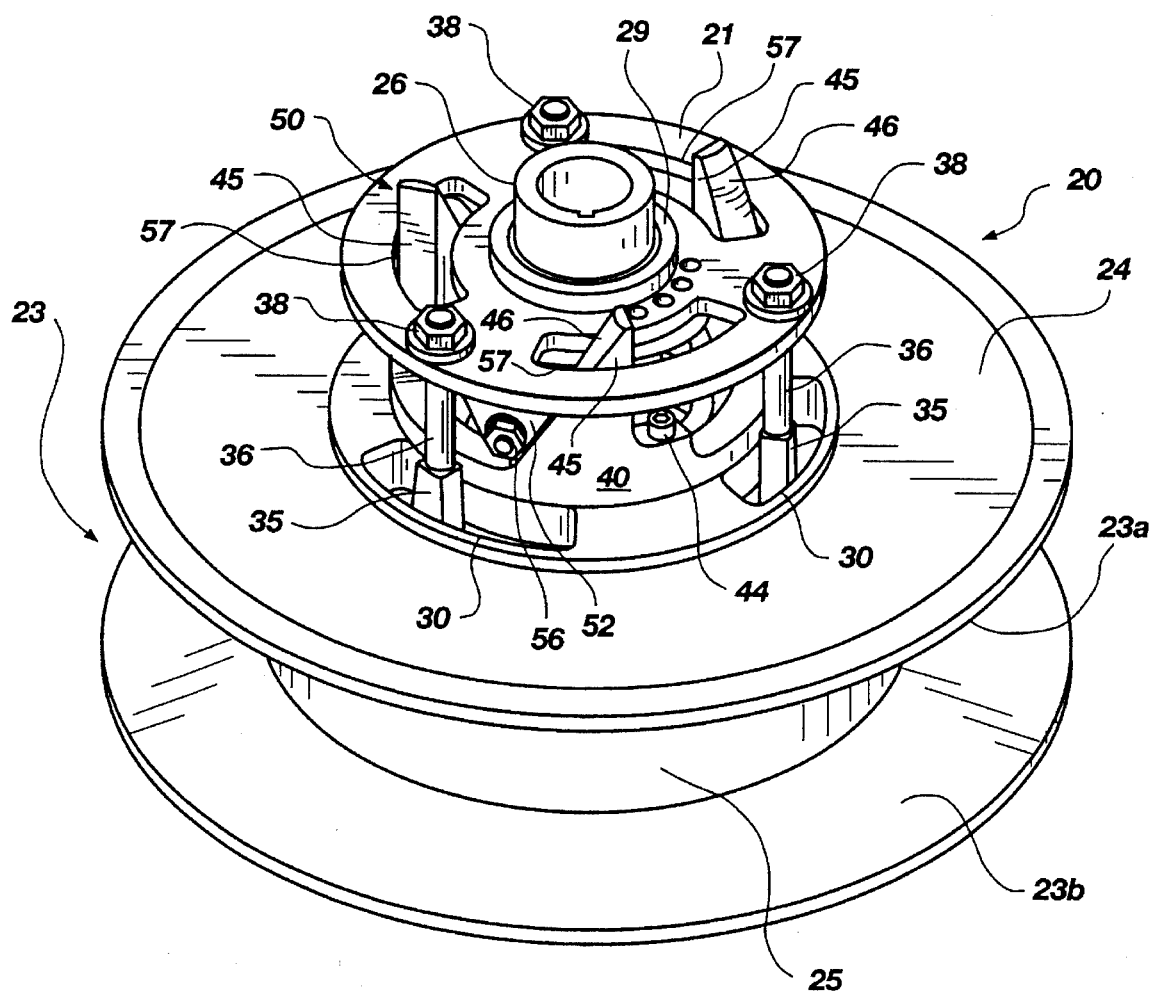
FIG. 3 shows the driven clutch assembly torque responsive actuation device of FIG. 2 as a top plane perspective view to illustrate the operation thereof where an actuator or clutch cover plate assembly thereof is moved toward an upper pulley half top face, thereby moving a lower pulley half away from which upper pulley half, opening a V formed between which pulley halves.
Figure 4:
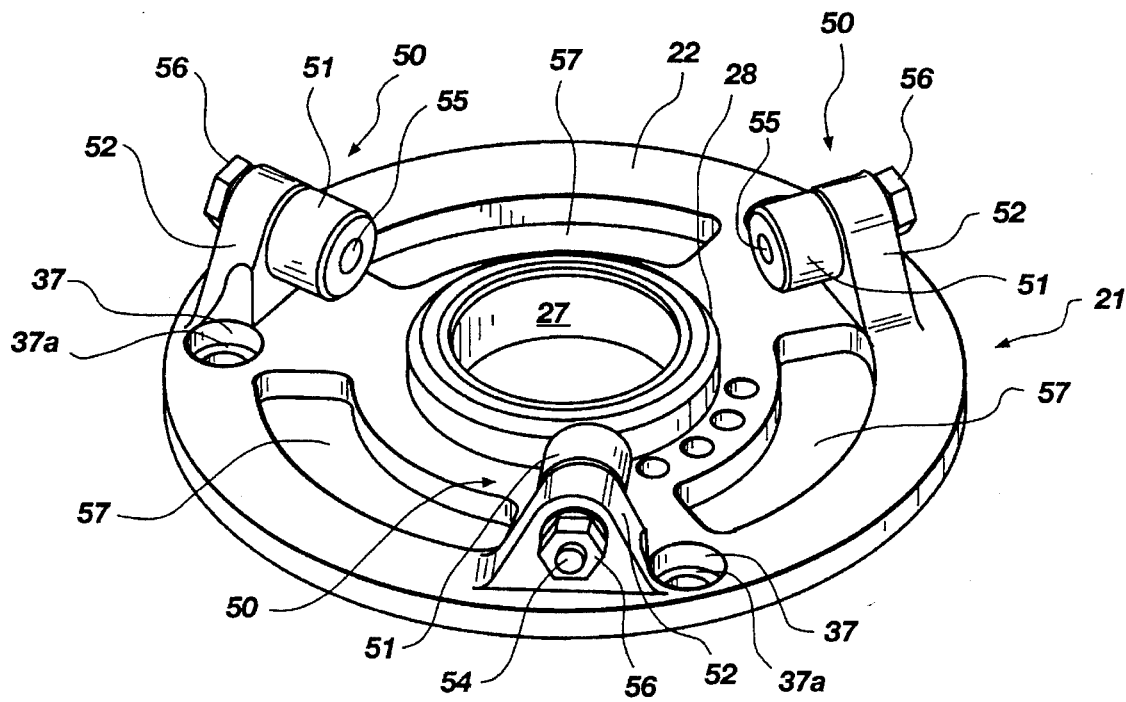
FIG. 4 is a bottom plan enlarged perspective view of the clutch cover plate assembly of the driven clutch assembly of FIGS. 2 and 3.
Figure 5:
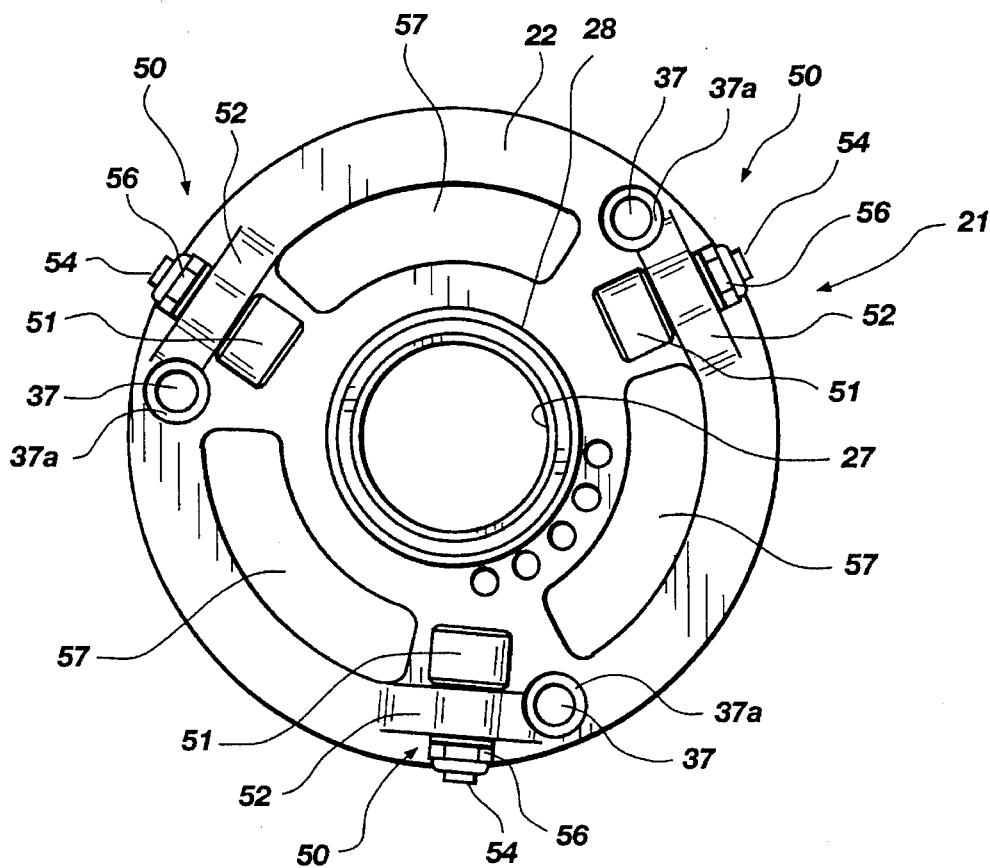
FIG. 5 is another bottom plan view of the clutch cover plate assembly of FIG. 3.

The clutch 20 of the present invention, is shown in FIGS. 2 and 3, includes an actuator or clutch cover plate 21, that is shown inverted in FIGS. 4 and 5 from its arrangement in FIGS. 2 and 3, showing the undersurface 22 thereof essentially parallel to an upper or top face 24 of an upper pulley half 23a of a pulley 23. Which pulley 23 consists of upper and lower pulley halves 23a and 23b, respectively, that have, when closed together, a deep V therebetween which a drive belt 25 fills. To provide pulley separation, reducing the pulley effective radius relative to the drive belt 25 therein, the lower pulley half 23b includes three piers 35, as shown best in FIG. 3, that are each secured to a hub area, at equal spaced intervals and equal radial distances from the lower pulley half center, and extend through arcuate openings 30 that are formed through the upper pulley half 23a hub area. The piers 35 each include a rod 36 extending axially from the top surface, which rods are each fitted through holes 37 formed through the clutch cover plate 21. The holes 37, as shown in FIGS. 4 and 5, are each stepped outwardly into flat ledge 37a, and the rod 36 ends are stepped inwardly into a flat shoulder. So arranged, each rod shoulder to fit against a hole ledge, and a rod end that extends through the hole 37 is threaded to receive nut 38 turned thereover, mounting the clutch cover plate 21 onto which rods 36. The clutch cover plate 21 also includes a center hole 28 wherein a bushing 27 is shown fitted. The bushing 27 is to support travel of a straight cylindrical shaft 26 between the attitudes shown in FIGS. 2 and 3. So shown, the straight cylindrical shaft 26 extends, at a right angle from the clutch cover plate 21 undersurface 22, is fitted through a center hole of the pulley 23, and is secured to the upper pulley half 23a to slide through the lower pulley half 23b.

The cylindrical shaft 26, as set out above, is fitted, at a right angle, through the center bushing 27 that is maintained in center hole 28 formed through the clutch cover plate 21, to allow the cylindrical shaft to turn or pivot relative to the clutch cover plate 21 during clutch 20 operation. This allows for clutch cover plate 21 pivoting or turning between the attitudes shown in FIGS. 2 and 3.

Movement of the clutch cover plate 21 towards the upper pulley half 23a top face 24 is transferred through the connecting rods 36 and piers 35 to the lower pulley half 23b, to move the pulley 23 halves apart, spreading the pulley V. Both the prior art clutch 10 of FIGS. 1 and 1A, and the clutch 20 of FIGS. 2 and 3, as discussed with respect to FIGS. 2 and 3, incorporate essentially the same arrangement of the clutch cover plate 21 and pulley 23 and are both operated to move the clutch cover plate towards the upper pulley half 23a top face 24. To provide for clutch cover plate and lower pulley half movement, both the prior art clutch 10 and clutch 20 of the invention include the radial equally spaced parallel piers 35 that are each secured to extend at right angles upwardly from the hub area of the lower pulley have 23b, through arcuate holes 30 formed in the upper pulley half 23a. Which piers 35 each include the smooth walled cylindrical rod 36 that extends axially from each pier top end. The cylindrical rods 36 are to fit through that holes 37 that are formed at radial spaced intervals through the clutch cover plate 21, as shown best in FIGS. 4 and 5. So arranged, the clutch cover plate 21 is maintained to the lower pulley half 23b and will slide up and down along cylindrical shaft 26 pivoting or turning relative to which cylindrical shaft 26, when traveling between the attitudes shown in FIGS. 2 and 3, to open the pulley 23, as described above.

As set out above, to secure the clutch cover plate 21 onto each of the cylindrical rods 36, the holes 37 through the clutch cover plate are stepped outwardly at 37a and the rod top ends are stepped inwardly, forming engaging surfaces. The rod 37 top ends are threaded to receive nuts 38 turned thereover. So arranged, the rod end shoulder that engages the hole 37 stepped portion 37a and the nut 38 turned over each rod end secures each rod 36 to the clutch cover plate 21. To bias the clutch cover plate 21 outwardly, as shown in FIG. 2, such that the pulley halves 23as and 23b are closed together, a coil spring 39 is disposed around the cylindrical shaft 26. The ends of coil spring 39 are arranged to engage, respectively, the undersurface 22 of the clutch cover plate 21 and the top face 24 of the upper pulley half 23a. Thereby, the coil spring 39 urges the clutch cover plate 21 outwardly to where the halves of pulley 23 are closed together, as shown in FIG. 2. Which biasing of coil spring 39 is overcome to urge the clutch cover plate towards the upper pulley half, spreading the pulley 23 V, as shown in FIG. 3.

Both the prior art clutch 10 and the clutch 20 of the invention preferably employ a helix or cam cone whereon are formed cam tracks that are each for guiding cam followers of the clutch cover plate as the clutch cover plate is moved towards and away from the upper pulley half. A helix or cam cone 40 of the invention, shown best in FIG. 6 and as a section in FIG. 2A, has been removed from its mounting to the top or upper face 24 of the pulley half 23a.

Each helix or cam cone 40 is preferably formed from a metal cylinder wherefrom sections of material are removed to leave a base ring 41 that includes a flat bottom surface. From the base ring 41, the helix or cam cone is stepped outwardly at equal radial points along a top surface thereof into spaced platforms 42 wherein are formed straight bolt hole 43 that extend therethrough. The bolt holes 43 are each to receive a bolt 44, shown in FIGS. 2 and 3, fitted therethrough and turned into holes, not shown, that have been formed in the upper or top face 24 of the upper pulley half 23a, mounting the helix or cam cone 40 thereto. Adjacent to each platform 42, the helix or cam cone is stepped outwardly into a cam section 45 that, as shown best in FIG. 6, is essentially a right triangle and includes a straight cam track 46 as the right triangle hypotenuse side.

It is the configuration of each cam track 46 and the utilization of a cam follower roller bearing 50 for travel therealong that are unique elements of the invention. Specifically, where the cam track of clutch 10 is essentially flat between the edges thereof, the cam track 46 of the invention is formed to have a radiused surface between the edges 46a and 46b thereof. Which radius of the convex curved surface between track 46 inner and outer edges 46a and 46b, respectively, is selected to provide a path of travel of a roller 51 of a cam follower bearing 50 that will remain centered along its length of travel along cam track 46. The path of roller 51 travel is shown in broken lines identified as A in FIG. 2A that shows a uniform curved surface thereacross that extends essentially the length of track 46. Which path A is equidistant from the cam track edges 46a and 46b. In practice, taking into account the radius of the helix or cam cone 41 and roller 51, a radius of cam track 46 for the varied cam angles as the cam follower roller will experience when traveling therealong.

The selection of a radius for the convex curve of track 46 is based on its slope that, of course, is also a helical curve that follows the curve of the helix or cam cone 40 as it travels down and therearound. Accordingly, the track 46 may be formed to have from a thirty degree (30°) to seventy degree (70°) slope and is shown herein as having approximately a fifty degree (50°) slope. For which slope a radius of approximately one (1) inch was selected for a track width of 0.375 inches, thereby producing, at the track center section, an arc with a width of 0.266 inches and a drop of 0.0089 inches from the track longitudinal center. This drop of 0.0089 inches is preferred for any cam track slope between thirty degrees (30°) and seventy degrees (70°), with the radius to be selected accordingly.

Using the one inch radius for the arc of track 46 provides for a maintenance of a single point of roller contact along the track as it turns in a helix, maintaining the roller centered therealong. As set out above, with the roller 51 centered on track 46, it will not experience binding or sliding as it travels therealong, providing thereby for an essentially frictionless shifting.

Figure 2B:
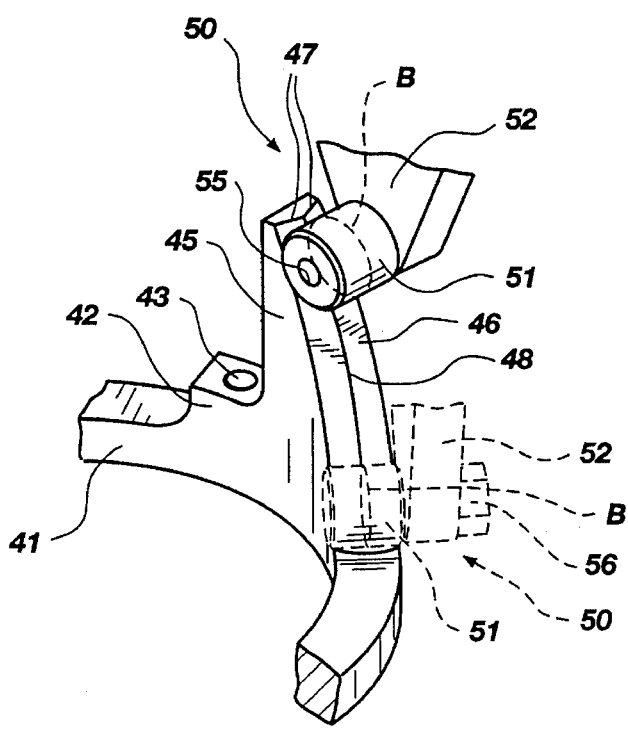
FIG. 2B is a view like FIG. 2A except that the track surface is shown as having a center apex therealong formed by the intersection of opposing straight sloping sides, and showing the roller traveling along the track apex.

Alternative to providing a radiused track, as set out above, the cam track 46 can be formed, as shown in FIG. 2B, to have opposing equal flat sloping sides 47 that slope together at an apex 48. Like the selection of the radius for a particular slope of from thirty degrees (30°) to seventy degrees (70°) of track 46, taking into account that the track is also a helical curve, the slope of sides 47 is selected to provide an apex 48 that the roller 51 center, broken lines B will roll along during clutch 20 operation. Accordingly, it should be understood that the cam track 46 can be radius or formed with opposing sloping sides that meet in an apex, or the like, as described, for providing a roller contact surface to center the roller along the cam track length precluding application of side loads on the cam roller bearing 50 through roller 51 as it travels therealong.

Absent a radiused cam track 46, as with the cam track of the clutch 10 or FIGS. 1 and 1A, a cam slide or cam follower needle bearing roller will experience a side load exerted thereon as the cam follower changes position along its length of travel along the cam track, at the varied cam angles as the cam follower experiences in that travel. Such side loads can potentially cause binding of the cam follower roller, causing clutch damage. Whereas, with the radiused surface of cam track 46 of the invention, during travel of the cam follower bearing 50 therealong, the bearing roller 51 is guided along cam track 46 path A, as shown in FIG. 2A.

Figure 8:
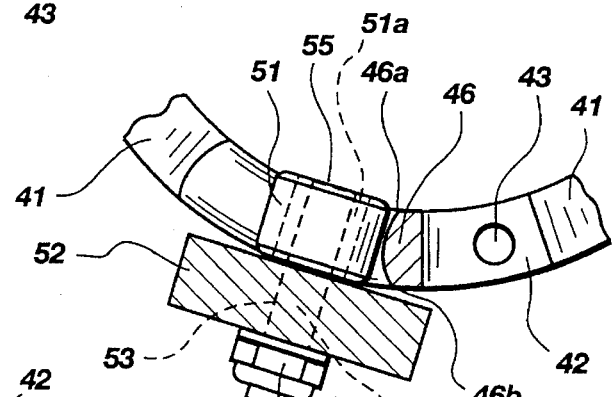
FIG. 8 is a top sectional view taken along the line 8—8 of FIG. 6 showing the radiused surface of the helix or cam track and showing a cam follower roller journaled to extend outwardly from an upright post of the clutch cover plate thereon, shown in broken lines.

Each cam follower bearing 50 includes the roller 51, as shown in FIGS. 4, 5 and 8, and is mounted on a shaft or bolt 54 that is fitted through each of three posts 52 that extend at right angles outwardly at equidistance radial distance intervals from one another around the center of the undersurface 22 of the clutch cover plate 21. Each post 52, as shown, is preferably formed as a flat section having a regular pyramid profile is connected to the clutch cover plate undersurface along its base and has a rounded apex that includes a hole 53 formed therethrough, shown best in FIG. 8, that receives a bolt 54 fitted therethrough. As shown, each bolt 54 includes a broad flat head end 55, and is threaded at its lower end to receive a nut 56 turned thereover. The bolt 54 is fitted through the cam follower bearing 50, that is preferably a sealed needle bearing, and the post 52. The roller 51 is journaled to turn freely on the sealed needle bearing 51a as shown in broken lines in FIG. 8.

As set out above, and as shown in FIGS. 2, 2A, 3, and 8, the roller 51 will travel up and down along cam track 46, following a center path therealong, illustrated as broken lines A in FIG. 2A. In that travel, from where the roller is at rest at approximately the top of cam track 46, during clutch 20 operation to spread apart the pulley halves 23a and 23b, as shown in FIG. 3, as the roller descends along the cam track 46 each cam track top end, that is the apex end of each cam section 45, will pass through one of three arcuate slots 47 that have been formed through the clutch cover plate 21. The arcuate slots 47 are spaced equidistantly apart and are at equal radial distances from the clutch cover plate center. The cam sections 45 to retract through the arcuate slots 47 when pressure to move the clutch cover plate 21 undersurface 22 towards the face 24 of the upper pulley half 23a is released, thereby allowing the coil spring 39 to return the clutch cover plate 21 to the attitude shown in FIG. 2.

While a preferred embodiment of my invention in a driven clutch assembly for a belt drive system has been shown and described herein, it should be understood that the present disclosure is made by way of example only and the invention is suitable for a number of uses, including use as a snowmobile clutch, and that variations and changes to the clutch assembly torque responsive actuation device as described are possible without departing from the subject matter coming within the scope of the following claims, and a reasonable equivalency thereof, which claims I regard as my invention.

I claim:

1. A torque responsive actuation device for a belt drive system comprising, a split pulley consisting of a pair of upper and lower pulley halves with a V slot therebetween to receive a drive belt; a cylindrical cam cone maintained to extend outwardly from a center of a top face of said upper pulley half and wherein are formed a plurality of equally spaced identical right triangle cam sections each of which includes a sloping straight cam track extending the length of the triangle hypotenuse side, and which said cam tracks are each identically formed to have a center crest along their length of a selected height to provide a roller means contact surface that is equidistant from edges of each said cam track along its entire length; a flat actuator plate for arrangement above said upper pulley half top face and including a plurality of cam follower means, one for each said cam track, that are mounted extend from an undersurface of said actuator cover plate, at equal spaced intervals around said actuator cover plate center, and each said cam follower means includes the roller means for traveling along each said cam track contact surface; means for maintaining alignment of said lower and upper pulley halves and said actuator cover plate; means for connecting said pulley lower half and said actuator cover plate; and spring biasing means for urging said actuator cover plate away from said upper pulley half top means.

2. A torque responsive actuation device for a belt drive system as recited in claim 1, wherein cam follower means is a bearing maintained through a bracket secured at a right angle to the undersurface of the actuator cover plate, and the roller means for traveling along each said cam track contact surface is a roller that includes an axle journaled in said bearing.

3. A torque responsive actuation device for a belt drive system as recited in claim 2, wherein the cam track center crest is a radiused surface as the roller means contact surface that is formed for a particular slope between thirty degrees (30°) and seventy degrees (70°) of each cylindrical cam cone of said cam track.

4. A torque responsive actuation device for a belt drive system as recited in claim 3, wherein the roller means contact surface is a convex surface formed between parallel cam track edges.

5. A torque responsive actuation device for a belt drive system as recited in claim 3, wherein the roller means contact surface is an apex of two like, oppositely sloping, flat surfaces that slope upwardly from the track edges and meet in the cam track center.

6. A torque responsive actuation device for a belt drive system as recited in claim 1, wherein the actuator cover plate center includes a center hole wherein a bushing is fitted that receives a straight rod, as the means for maintaining alignment, that is fitted through aligned center holes of the pulley upper and lower halves; and the spring biasing means is a coil spring disposed around said straight rod, between said clutch cover plate and the upper pulley half top face.

7. A torque responsive actuation device for a belt drive system as recited in claim 1, further including spaced holes formed through the actuator cover plate that are identical arcuate slots, spaced equally from one another, are at an equal radial distances from the actuator cover plate center and are aligned for receiving top portions of the right triangle cam sections fitted therethrough.

8. A torque responsive actuation device for a belt drive system as recited in claim 1, wherein the means for connecting the actuator cover plate and lower pulley half are a plurality of equally spaced piers that include rods extending axially out of top ends thereof, which said piers are each secured, at their lower ends, to said lower pulley half hub, are each radially equidistant from the center of said lower pulley half, each will project at right angles through holes formed in the upper pulley half, and ends of said rods are secured to said clutch cover plate at approximately right angles to the undersurface thereof.

9. A torque responsive actuation device for a belt drive system as recited in claim 1, wherein the cylindrical cam cone is formed to have a bottom ring with a flat under surface, and the means for securing the cylindrical cam cone to the top face of the upper pulley half consists of spaced holes formed through said bottom ring that are for receiving bolt type fasteners fitted therethrough and turned into said top face of said upper pulley half.

* * * * *